(12) United States Patent
Myerscough

(10) Patent No.: US 11,673,640 B2
(45) Date of Patent: Jun. 13, 2023

(54) METHOD OF LOADING A BLADDER INTO AN OUTER ENVELOPE OF AN INFLATABLE KITE

(71) Applicant: OCEAN RODEO SPORTS INC., Victoria (CA)

(72) Inventor: Richard Kerr Myerscough, Victoria (CA)

(73) Assignee: OCEAN RODEO SPORTS INC., Victoria (CA)

( * ) Notice: Subject to any disclaimer, the term of this patent is extended or adjusted under 35 U.S.C. 154(b) by 334 days.

(21) Appl. No.: 16/989,095

(22) Filed: Aug. 10, 2020

(65) Prior Publication Data

US 2021/0047020 A1 Feb. 18, 2021

Related U.S. Application Data

(60) Provisional application No. 62/886,855, filed on Aug. 14, 2019.

(51) Int. Cl.
*B63H 8/12* (2020.01)
*B64C 31/06* (2020.01)

(52) U.S. Cl.
CPC ............... *B63H 8/12* (2020.02); *B64C 31/06* (2013.01); *B64C 2031/065* (2013.01)

(58) Field of Classification Search
CPC .... B63H 8/12; B63H 31/06; B63H 2031/065; B63H 9/0615; B63H 6/1028; B63H 9/1021; B63H 9/069; B64C 31/06; B64C 2031/065
See application file for complete search history.

(56) References Cited

U.S. PATENT DOCUMENTS

| | | | | |
|---|---|---|---|---|
| 4,708,078 A | * | 11/1987 | Legaignoux | B64D 17/025 244/145 |
| 4,846,424 A | * | 7/1989 | Prouty | A63H 27/08 244/152 |
| 9,957,043 B2 | * | 5/2018 | Harrington | B63H 8/12 |
| 2004/0188567 A1 | * | 9/2004 | Logosz | B64C 31/06 244/146 |
| 2017/0096211 A1 | * | 4/2017 | Morris | B63H 8/16 |

OTHER PUBLICATIONS

Ocean Rodeo, Ocean Rodeo Bladder Replacement Guide, https://www.youtube.com/watch?v=Q-BvHWCbUsc, Jul. 2010 (Year: 2010).*

* cited by examiner

*Primary Examiner* — Medhat Badawi
*Assistant Examiner* — Vicente Rodriguez

(57) ABSTRACT

A method of loading a bladder into an outer envelope of an inflatable kite involves inserting the bladder through a valve opening in a portion of the outer envelope of the inflatable kite until a valve of the bladder is positioned in the valve opening. The preferred manner of inserting the bladder into position is accomplished by securing a line to a remote end of the bladder and using the line to draw the bladder through the valve opening.

14 Claims, 11 Drawing Sheets

METHOD OF LOADING A BLADDER INTO AN OUTER ENVELOPE OF AN INFLATABLE KITE

FIELD

There is described a method of loading a bladder into an outer envelope of an inflatable kite.

BACKGROUND

Inflatable kites, wings and sails use gas pressure leading edge tube and struts to create a semi rigid air frame used to support the wing canopy in an aerodynamic efficient shape.

These gas inflated air frames consist of outer envelopes typically in the shape of leading edge tube and struts, with gas holding bladders inserted within the outer envelopes. The gas holding bladders when inflated, tension the outer envelope, which then takes the designed aerodynamic shape.

The current standard method is to insert a gas holding bladder into a strut envelope by inserting the bladder via an insertion port opening in the trailing edge end of the outer strut envelope. An inflation valve of the gas holding bladder is passed through this strut end insertion port opening. Once the air holding bladder is inserted, the insertion port opening of the outer envelope strut is closed to allow the bladder to be pressurized against the outer envelope. To close the strut trailing edge insertion port opening both the gas holding bladder end and outer envelope strut end are folded and held in place by tabs of Velcro plush and hook.

Inflatable leading edge tubes feature the same gas holding bladder insertion designs as used on the struts, with the addition of a zippered insertion port typically located mid distance along the leading edge tube. This zipper insertion port is used to insert the gas holding bladder into the leading edge tube outer envelope.

SUMMARY

There is provided a method of loading a bladder into an outer envelope of an inflatable kite. The method involves inserting the bladder through a valve opening in a portion of the outer envelope of the inflatable kite until a valve of the bladder is positioned in the valve opening.

The preferred manner of inserting the bladder into position is accomplished by securing a line to a remote end of the bladder and using the line to draw the bladder through the valve opening.

The above described method uses the valve opening as the insertion port to insert the gas holding bladder into the both the leading edge tube and strut envelopes. The valve opening is the same opening as is used to position the inflation valve.

By inserting the gas holding bladder into the valve opening, the size of the opening at the trailing edge is dramatically reduced. It is no longer necessary to fold and secure with Velcro fasteners the trailing edge of the strut. It is no longer necessary to have a zipper insertion port to insert the bladder in the leading edge tube. By removing the Velcro materials and zippered insertion port, weight saving are realized. With the reduction of weight performance and handling is greatly enhanced.

This method also allows improved aerodynamic shaping of the struts ends and leading edge tube ends to a fine point, reducing aerodynamic drag.

Additionally, with no need for folds and Velcro closures, a potential snag point for kite lines or bridle lines is removed. The folds and Velcro closures sometimes resulted in small voids at the ends causing an aneurysm upon pressurization, resulting in a failure of the gas holding bladder.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

In order that the advance in the art provided by the method can be fully understood, there will first be described the prior art, which is illustrated in FIG. 19 through FIG. 24.

PRIOR ART

Figure 19:
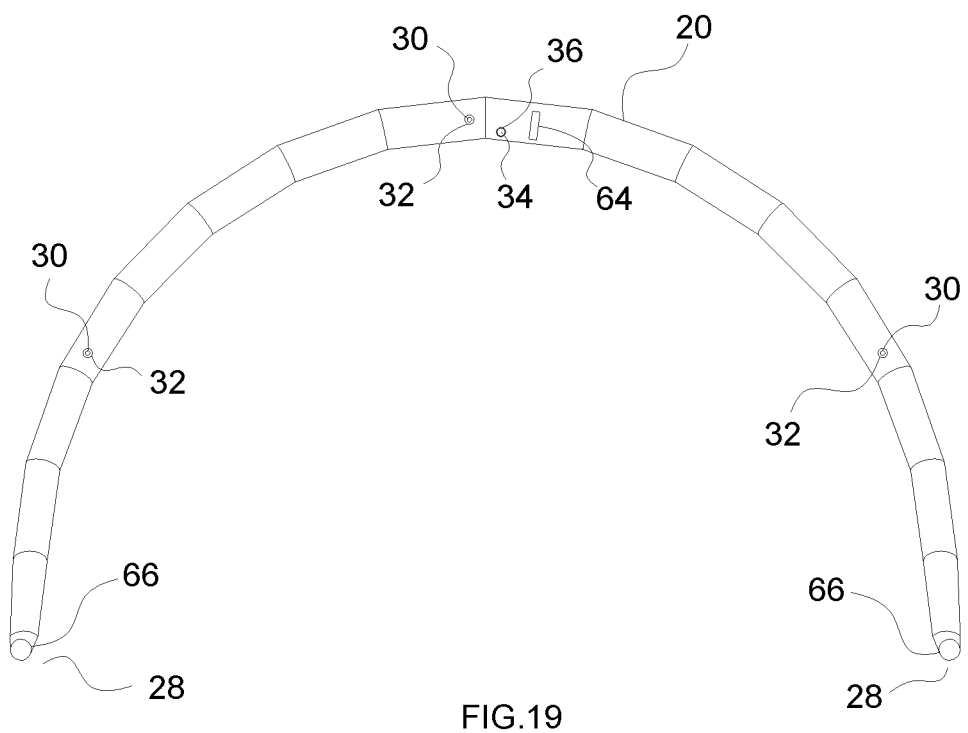
FIG. 19, labelled as PRIOR ART, is a rear elevation view of a leading edge tube.

FIG. 19—Is a rear elevation view of a Prior Art leading edge tube 20 showing the strut valve openings 32 with strut valves 30 protruding and the inflation valve opening 36 with the inflation valve 34 protruding, with leading edge tube bladder trailing edge access ports 66 located at the trailing edge 28 and a leading edge tube bladder insertion port 64 located near the inflation valve opening 36.

Figure 20:
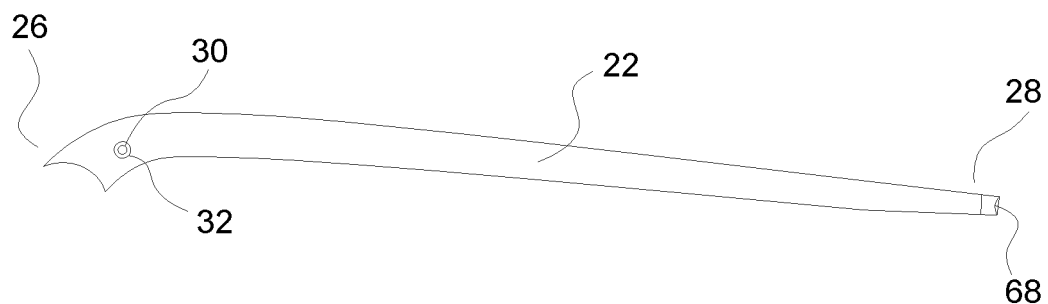
FIG. 20, labelled as PRIOR ART, is a side elevation view of a strut.

FIG. 20—Is a side elevation view of a Prior Art strut 22 showing the strut valve opening 32, with strut valve 30 protruding, near the leading edge 26 and a strut bladder trailing edge insertion port 68 at the trailing edge 28.

Figure 21:
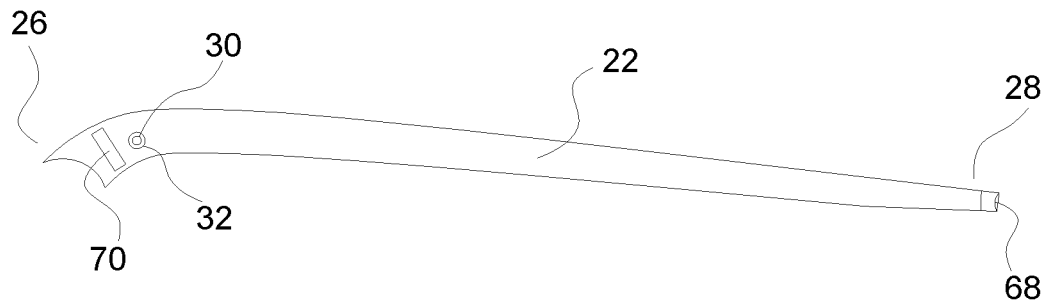
FIG. 21, labelled as PRIOR ART, is a side elevation view of an alternative embodiment of strut having a strut bladder leading edge access port.

FIG. 21—Is a side elevation view of a Prior Art strut 22 showing the strut valve opening 32, with strut valve 30 protruding, and strut bladder leading edge access port 70 near the leading edge 26 and a strut bladder trailing edge insertion port 68 at the trailing edge 28.

Figure 22:
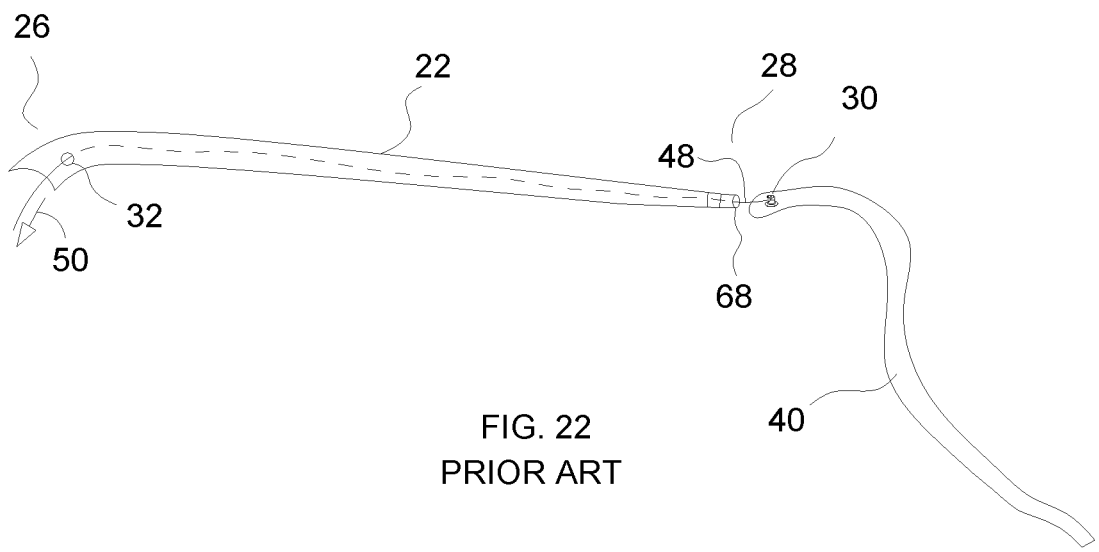
FIG. 22, labelled as PRIOR ART, is a side elevation view of the strut of FIG. 20, showing bladder insertion.

FIG. 22—Is a side elevation view of a Prior Art strut 22, with strut valve opening 32 near the leading edge 26 and a strut bladder trailing edge insertion port 68 at the trailing edge 28, showing how the strut bladder 40, with strut valve 30, is pulled into the strut 22 through the strut bladder trailing edge insertion port 68 by a strut bladder insertion line 48, that has one end that is connected to the strut valve 30 and the other end exits the strut 22 through the strut valve opening 32, so that when direction of pull 50 is applied to the strut bladder insertion line 48 the strut bladder 40 is pulled inside the strut 22 through the strut bladder trailing edge insertion port 68.

Figure 23:
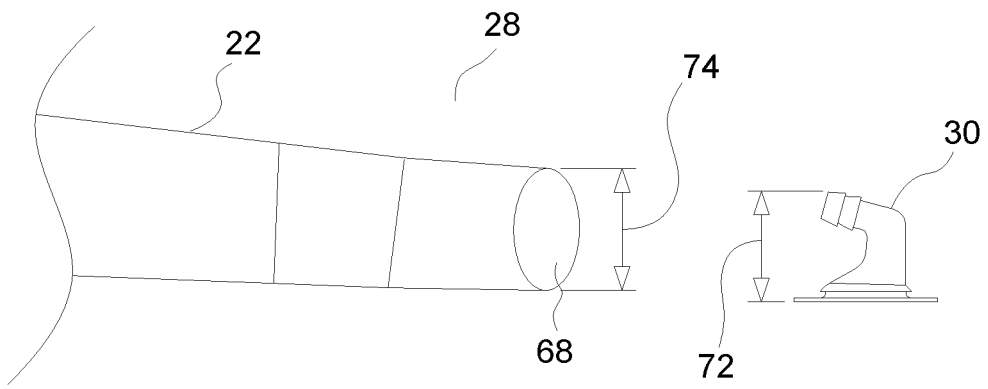
FIG. 23, labelled as PRIOR ART, is a detailed side elevation view of a trailing edge of the strut of FIG. 22.

FIG. 23—Is a detailed side elevation view of a Prior Art strut 22, shown in FIG. 21, at the trailing edge 28 showing the strut bladder trailing edge insertion port 68 and the size of strut bladder trailing edge insertion port 74 is equal to or greater than the size of the strut valve 72.

Figure 24:
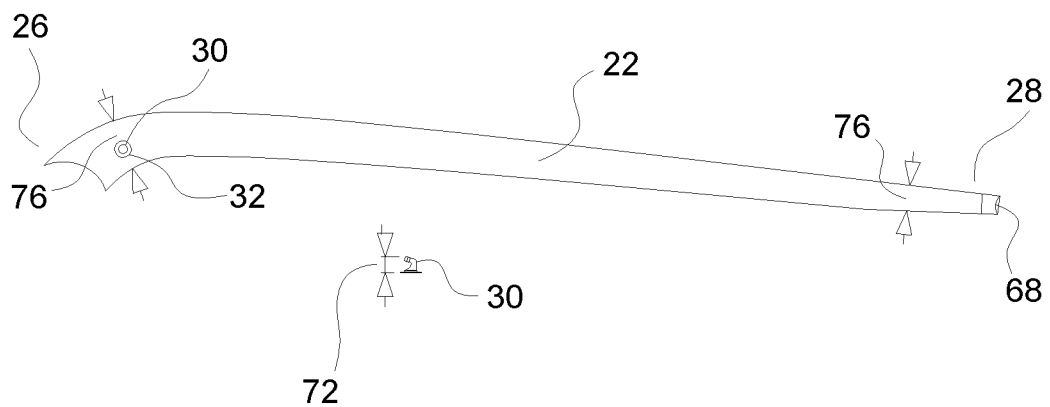
FIG. 24, labelled as PRIOR ART, is a elevation view of a trailing edge of the strut of FIG. 22.

FIG. 24—Is a side elevation view of a Prior Art strut 22 with the strut valve opening 32 and strut valve 30 protruding, near the leading edge 26 and a strut bladder trailing edge insertion port 68 at the trailing edge 28 showing that the thickness 76 of the strut 22 from the section at the strut valve opening 32 all the way to the strut bladder trailing edge insertion port 74, at the trailing edge 28 end, is equal to or greater than the size of the strut valve 72.

Method

The method of loading a bladder into an outer envelope of an inflatable kite will now be described with reference to FIG. 1 through FIG. 18.

An outer envelope of an inflatable kite has different portions, namely a leading edge tube 20 and struts 22. The method will first be described in relation to leading edge tube 20 with reference to FIG. 7 and will then be described in relation to strut 22 with reference to FIG. 9.

Figure 7:
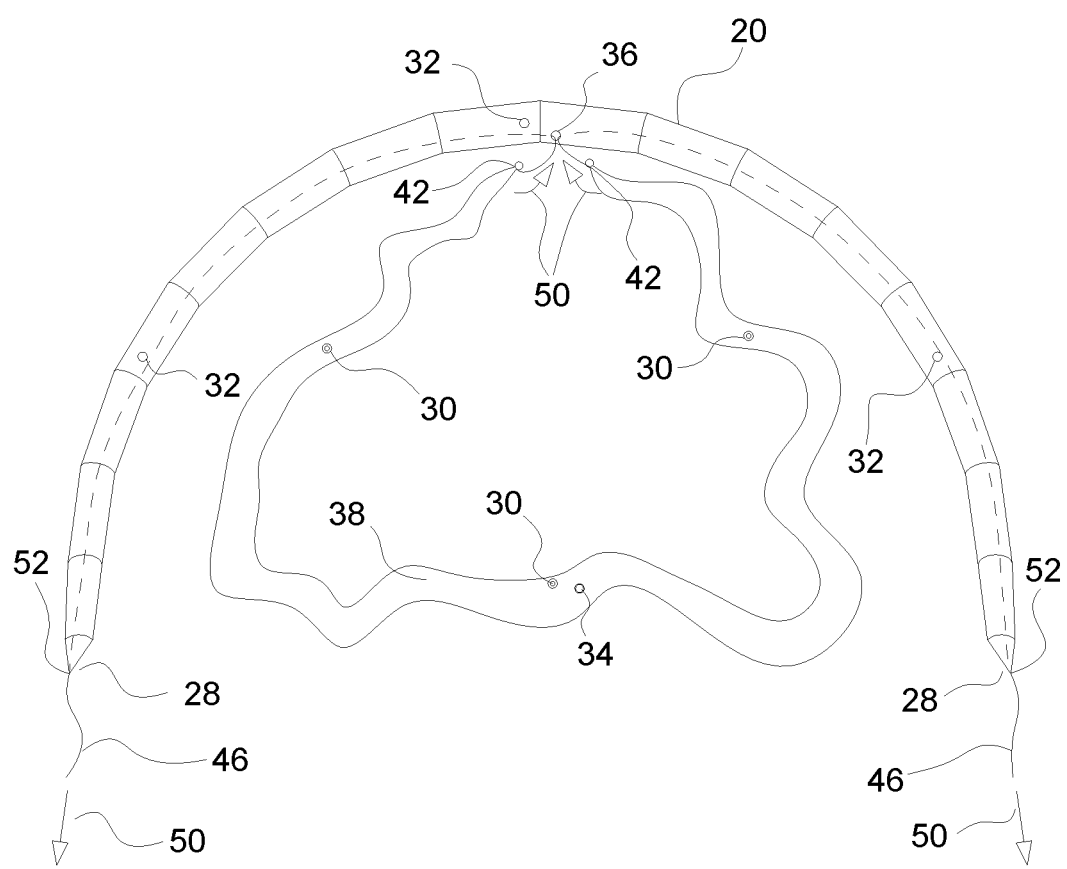
FIG. 7 is a rear elevation view of a leading edge tube from FIG. 2, with bladder pulled in by a line.

Referring to FIG. 7, the method in relation to leading edge tube 20 involves securing a line 46 to leading edge tube bladder ends 42 of leading edge tube bladder 38. The method involves inserting line 46 into inflation valve opening 36, with line 46 exiting through leading edge tube line opening 52. The method involves grasping line 46 at the leading edge tube line opening 52 and, with a pull direction as indicated by reference numeral 50, using line 46 to draw leading edge tube bladder 38 through inflation valve opening 36 and into leading edge tube 20 until inflation valve 34 is positioned in inflation valve opening 36.

Figure 9:
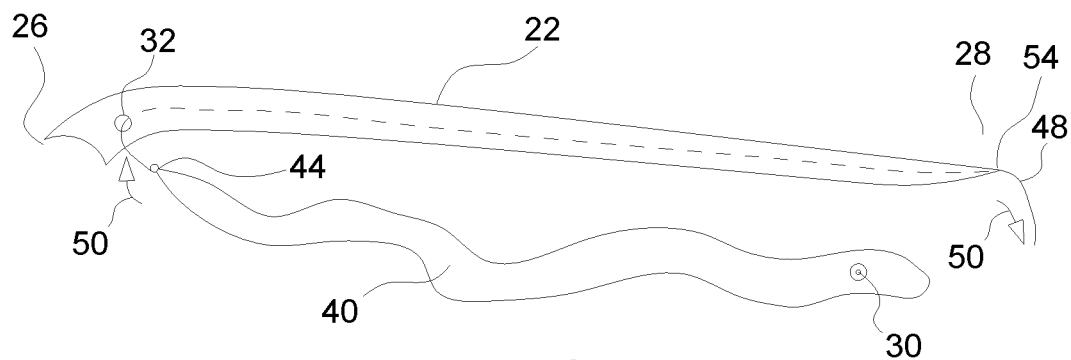
FIG. 9 is a side elevation view of the strut from FIG. 4, with bladder pulled in by a line.

Referring to FIG. 9, the method in relation to strut 22 involves securing a line 48 to strut bladder ends 44 of strut bladder 40. The method involves inserting line 48 into strut valve opening 32, with line 48 exiting through strut line opening 54. The method involves grasping line 48 at the strut line opening 54 and, with a pull direction as indicated by reference numeral 50, using line 48 to draw strut bladder 40 through strut valve opening 32 and into strut 22 until strut valve 30 is positioned in strut valve opening 32.

Figure 11:
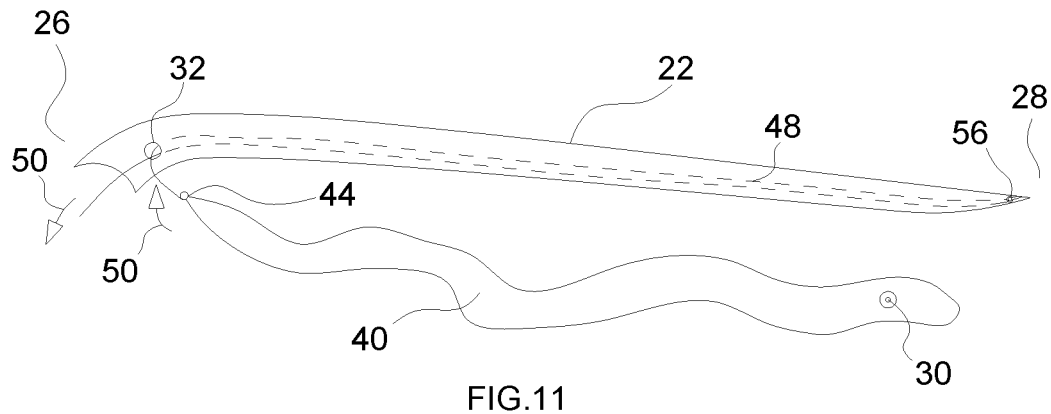
FIG. 11 is a side elevation view of the strut from FIG. 4, with a line ring used to facilitate a change of direction of a line.
Figure 12:
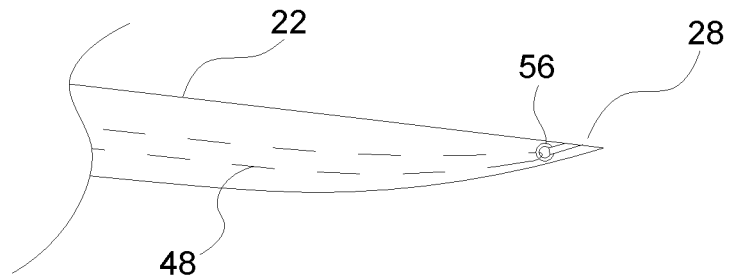
FIG. 12 is a detailed side elevation view of the strut from FIG. 11.

Referring to FIG. 11 and FIG. 12, direction of pull 50 can be altered by securing inside of the outer envelope a device that facilitates a change of direction. Chosen for illustration is a line ring 56. It will be appreciated that there are other pulleys, studs and other devices that could serve the same purpose.

In order to facilitate a full understanding, a figure by figure description has been provided below.

Figure 1:
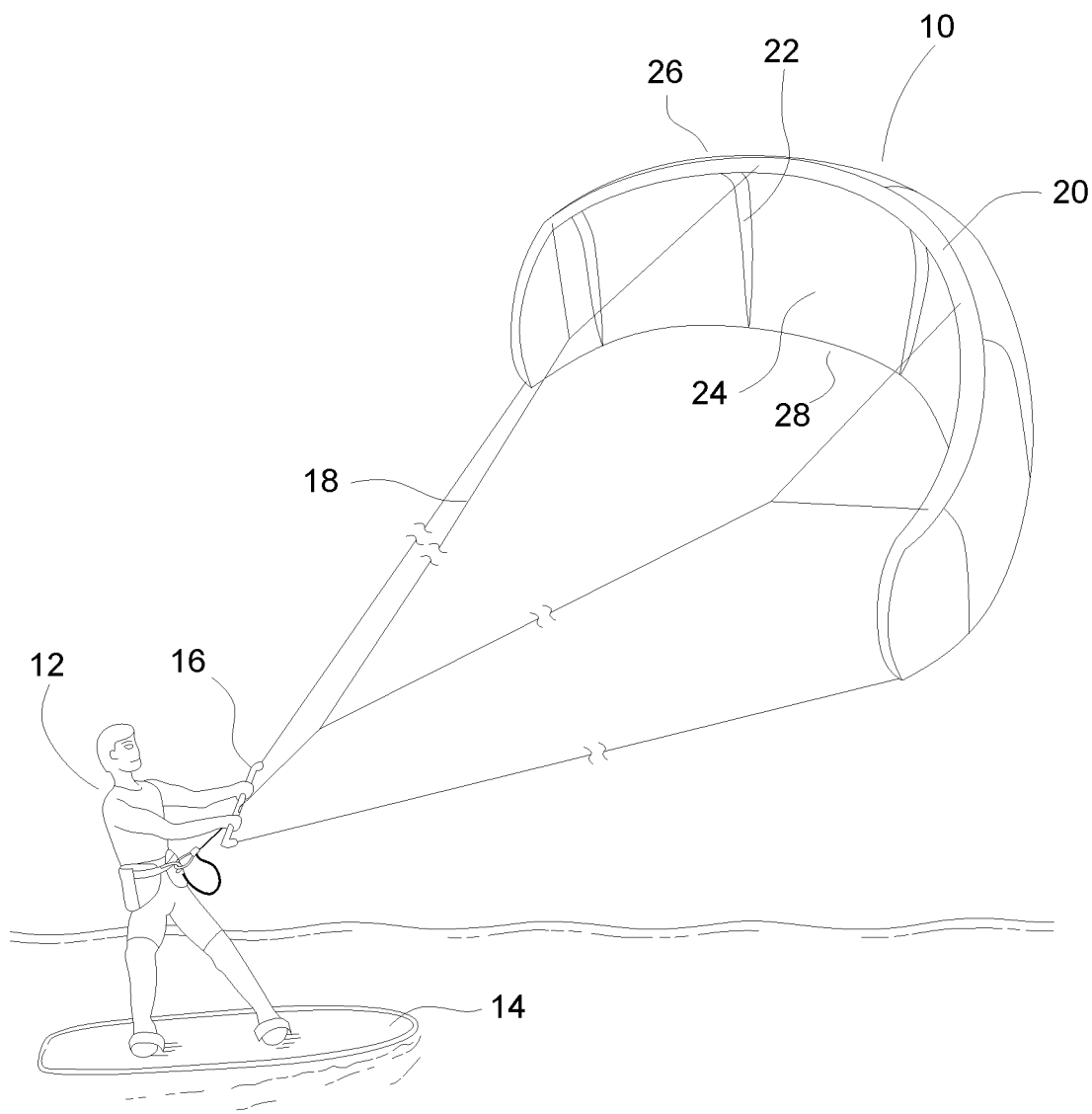
FIG. 1 is a perspective view of an inflatable kite.

FIG. 1—Is a perspective view of a rider 12 standing on a board 14 holding a bar 16 that is attached to a kite 10 via lines 18. Kite 10 has a leading edge tube 20, struts 22 and a canopy 24. The front of the kite 10 is referred to as the leading edge 26 and the back of the kite is referred to as the trailing edge 28.

Figure 2:
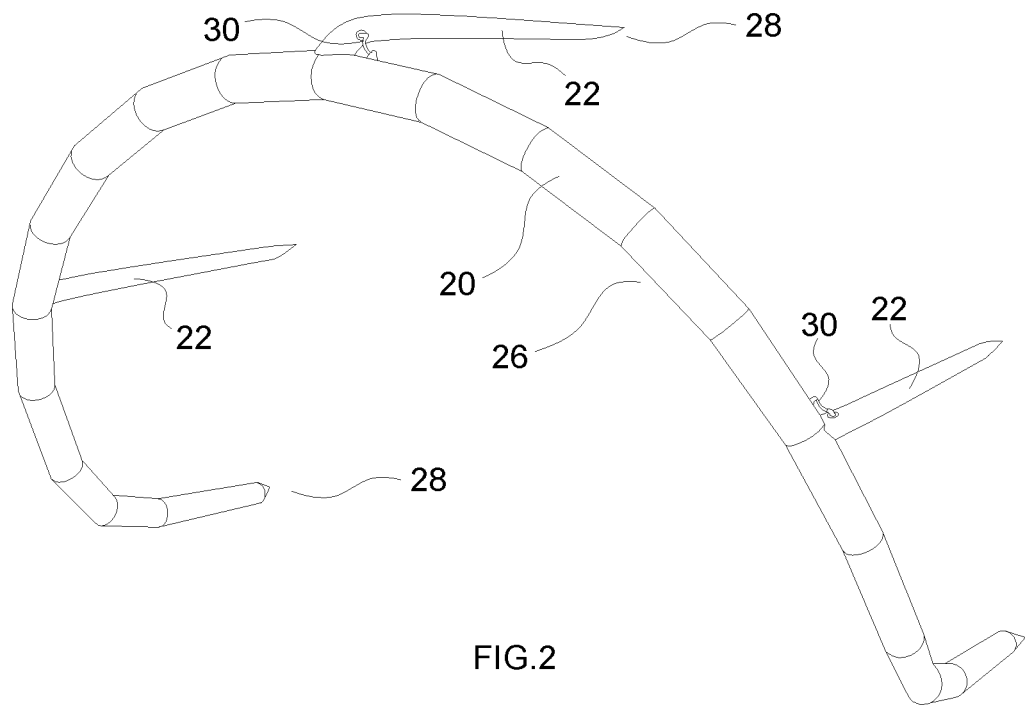
FIG. 2 is a perspective view of a leading edge tube and struts of the inflatable kite of FIG. 1, with the canopy removed.

FIG. 2—Is a perspective view of the leading edge tube 20 and struts 22 with the canopy 24 removed. There are strut valves 30 that allow the struts 22 to be filled with air.

Figure 3:
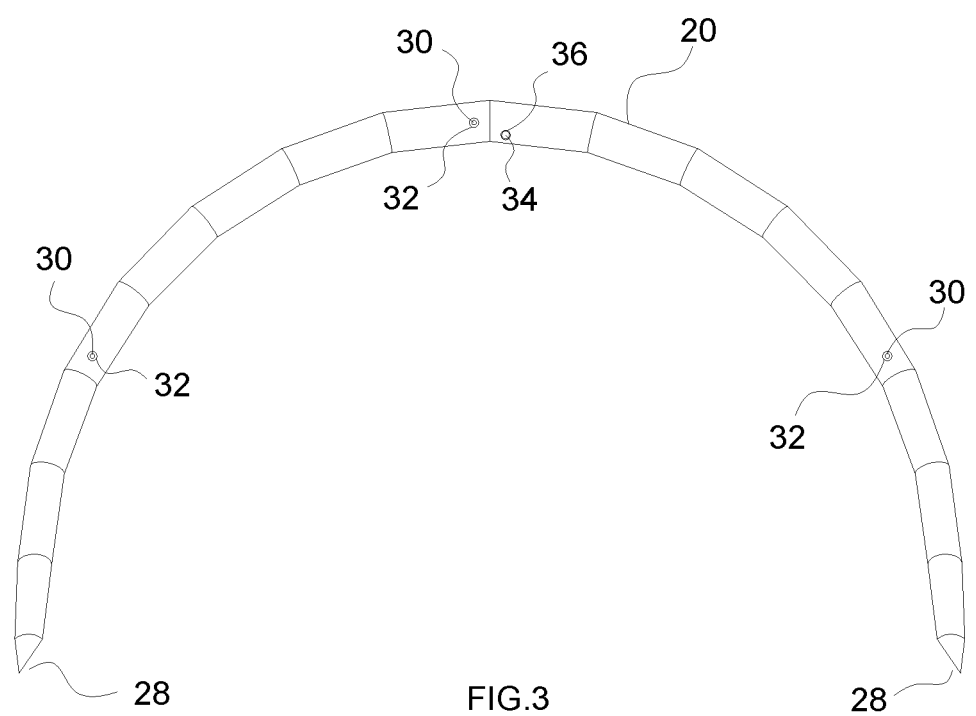
FIG. 3 is a rear elevation view of the leading edge tube and struts of FIG. 2.

FIG. 3—Is a rear elevation view of the leading edge tube 20 showing the strut valve openings 32 with strut valves 30 protruding and the inflation valve opening 36 with the inflation valve 34 protruding.

Figure 4:
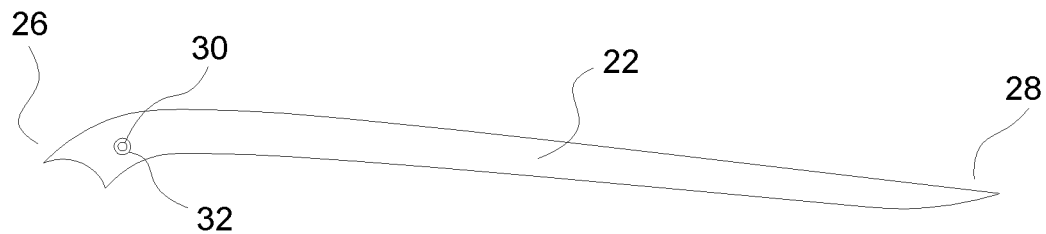
FIG. 4 is a side elevation view of a strut from FIG. 2.

FIG. 4—Is a side elevation view of a strut 22 with a leading edge 26 end and a trailing edge 28 end showing the strut valve opening 32 with strut valve 30 protruding.

Figure 5:
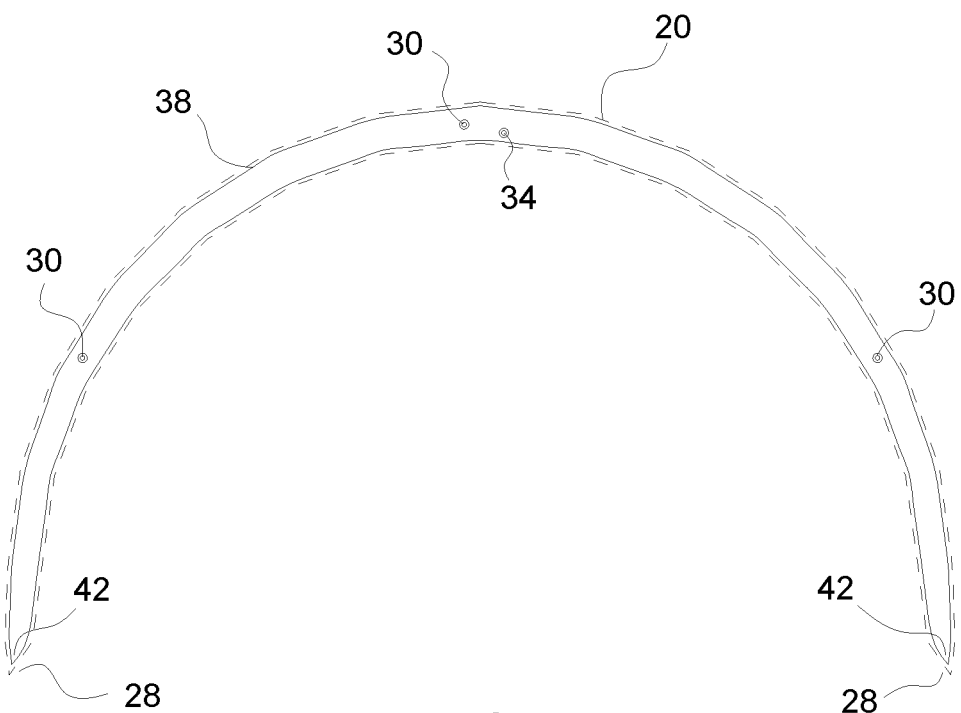
FIG. 5 is a longitudinal section view of the leading edge tube and struts of FIG. 2.

FIG. 5—Is a longitudinal section view of the leading edge tube 20 showing the leading edge tube bladder 38 inside and the leading edge tube bladder ends 42 extending all the way to the trailing edge 28 of the leading edge tube 20. The inflation valve 34 and strut valves 30 are connected to the leading edge tube bladder 38.

Figure 6:
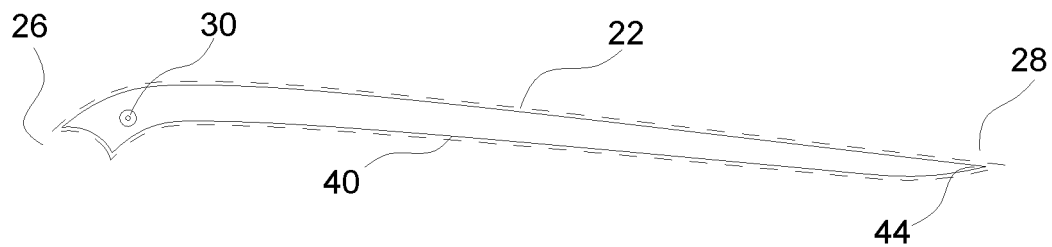
FIG. 6 is a longitudinal section view of the strut of FIG. 4.

FIG. 6—Is a longitudinal section view of a strut 22 with a leading edge 26 end and a trailing edge 28 end showing the strut valve opening 32 with strut valve 30 protruding.

FIG. 7—Is a rear elevation view of a leading edge tube 20, with inflation valve opening 36, strut valve openings 32 and leading edge tube line openings 52 at the trailing edge 28, showing how the leading edge tube bladder 38, with inflation valve 34, strut valves 30 and leading edge tube bladder ends 42, is pulled into the leading edge tube 20 through the inflation valve opening 36 by leading edge bladder insertion lines 46 that have ends that connect to the leading edge tube bladder ends 42 and the other ends exit the leading edge tube 20 through the leading edge tube line opening 52 so that when direction of pull 50 is applied to the leading edge bladder insertion lines 46 the leading edge tube bladder 38 is pulled inside the leading edge tube 20 through the inflation valve opening 36.

Figure 8:
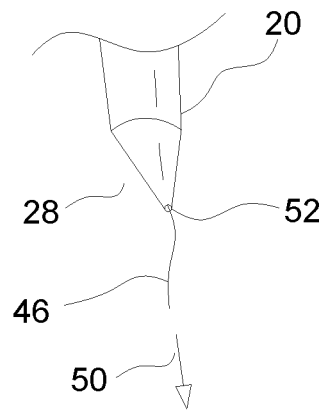
FIG. 8 is a detailed rear elevation view of the leading edge tube from FIG. 7.

FIG. 8—Is a detailed rear elevation view of the leading edge tube 20 shown in FIG. 7, at the trailing edge 28 showing the leading edge tube bladder insertion line 46 exiting through the leading edge tube line opening 52 and the direction of pull 50 that is applied to the leading edge tube bladder insertion line 46.

FIG. 9—Is a side elevation view of strut 22, with strut valve opening 32 near the leading edge 26 and strut line opening 54 at the trailing edge 28, showing how the strut bladder 40, with strut valve 30 and strut bladder end 44, is pulled into the strut 22 through the strut valve opening 32 by a strut bladder insertion line 48, that has one end that is connected to the strut bladder end 44 and the other end exits the strut 22 through the strut line opening 54, so that when direction of pull 50 is applied to the strut bladder insertion line 48 the strut bladder 40 is pulled inside the strut 22 through the strut valve opening 32.

Figure 10:
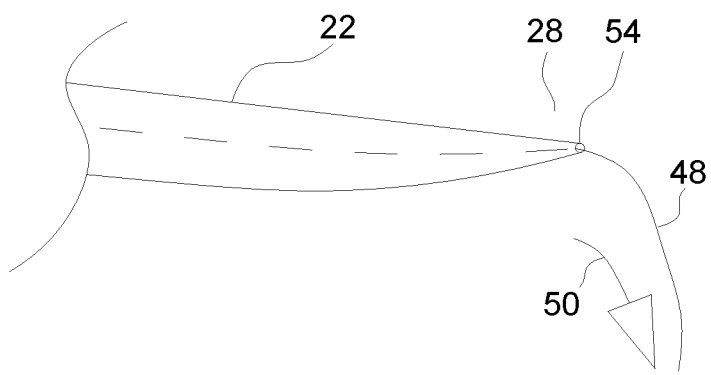
FIG. 10 is a detailed side elevation view of the strut from FIG. 9.

FIG. 10—Is a detailed side elevation view of the strut 22 shown in FIG. 9, at the trailing edge 28 showing the strut bladder insertion line 48 exiting through the strut line opening 54 and the direction of pull 50 that is applied to the strut bladder insertion line 48.

FIG. 11—Is a side elevation view of strut 22, with strut valve opening 32 near the leading edge 26 and strut line opening 54 at the trailing edge 28, showing an alternative embodiment of how the strut bladder 40, with strut valve 30 and strut bladder end 44, can be pulled into the strut 22 through the strut valve opening 32 by a strut bladder insertion line 48, that has one end that is connected to the strut bladder end 44 then runs through a line ring 56, that is affixed inside the strut 22 at the trailing edge 28 end and the other end exits the strut 22 back through the strut valve opening 32, so that when direction of pull 50 is applied to the strut bladder insertion line 48 the strut bladder 40 is pulled inside the strut 22 through the strut valve opening 32.

FIG. 12—Is a detailed side elevation view of the strut 22 shown in FIG. 11, at the trailing edge 28 showing the strut bladder insertion line 48 running through a line ring 56 that is affixed inside the strut 22 at the trailing edge 28 end.

Figure 13:
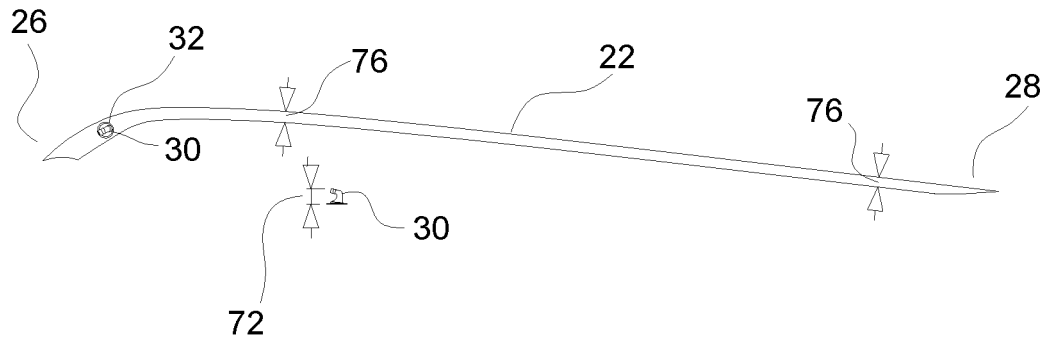
FIG. 13 is a side elevation view of an alternate embodiment of strut with a slim profile.

FIG. 13—Is a side elevation view of the strut 22, with strut valve opening 32 near the leading edge 26, with strut valve 30, showing that the thickness 76 of the strut 22 from the section just aft of the strut valve opening 32 all the way to the trailing edge 28 end can be smaller than the size of the strut valve 72.

Figure 14:
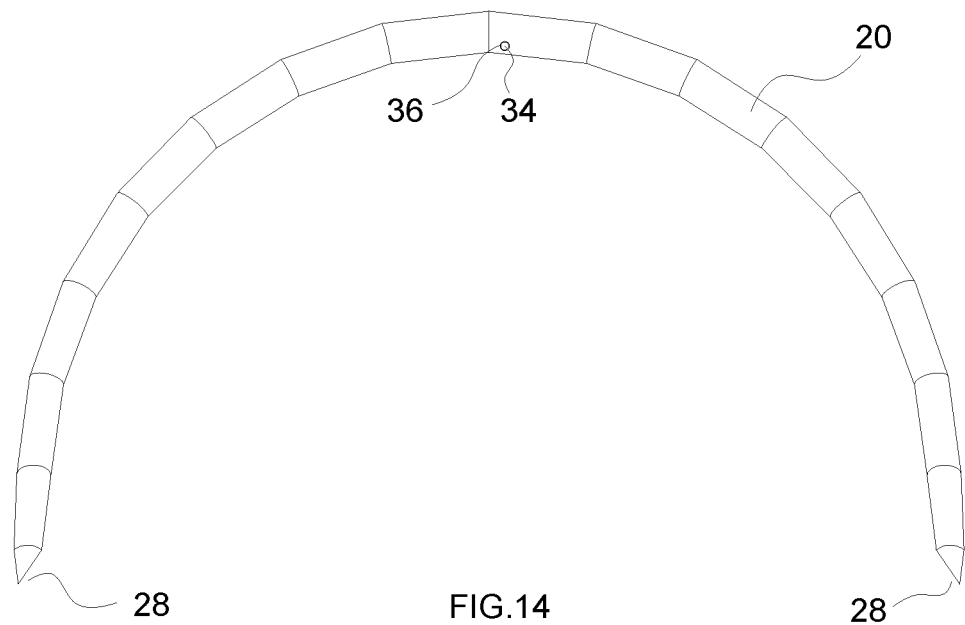
FIG. 14 is a rear elevation view of an alternative embodiment of leading edge tube for an inflatable kite that has no struts.

FIG. 14—Is a rear elevation view of the leading edge tube 20, on a kite that has no struts, showing the inflation valve opening 36 with the inflation valve 34 protruding.

Figure 15:
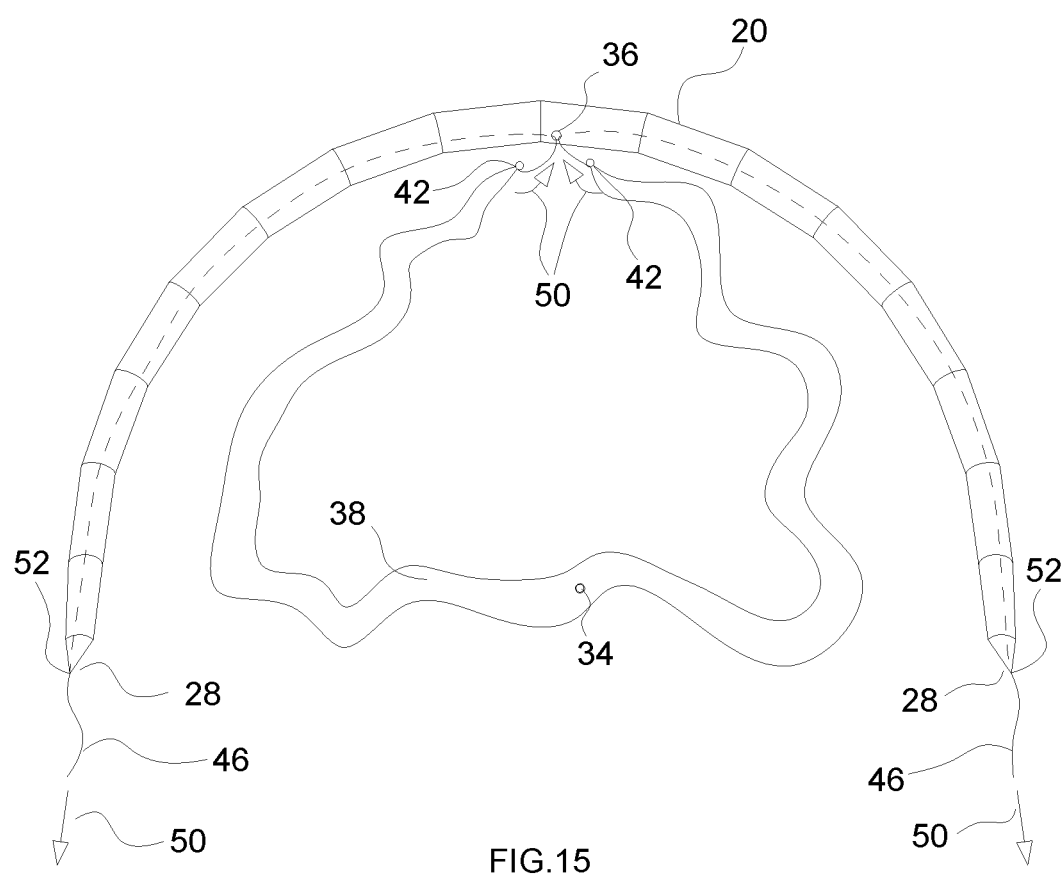
FIG. 15 is a rear elevation view of the leading edge tube from FIG. 14, with bladder pulled in by a line.

FIG. 15—Is a rear elevation view of a leading edge tube 20, on a kite that has no struts, (such as illustrated in FIG. 14) with inflation valve opening 36 and leading edge tube line openings 52 at the trailing edge 28, showing how the leading edge tube bladder 38, with inflation valve 34 and leading edge tube bladder ends 42, is pulled into the leading edge tube 20 through the inflation valve opening 36 by leading edge bladder insertion lines 46 that have ends that connect to the leading edge tube bladder ends 42 and the other ends exit the leading edge tube 20 through the leading edge tube line opening 52 so that when direction of pull 50 is applied to the leading edge bladder insertion lines 46 the leading edge tube bladder 38 is pulled inside the leading edge tube 20 through the inflation valve opening 36.

Figure 16:
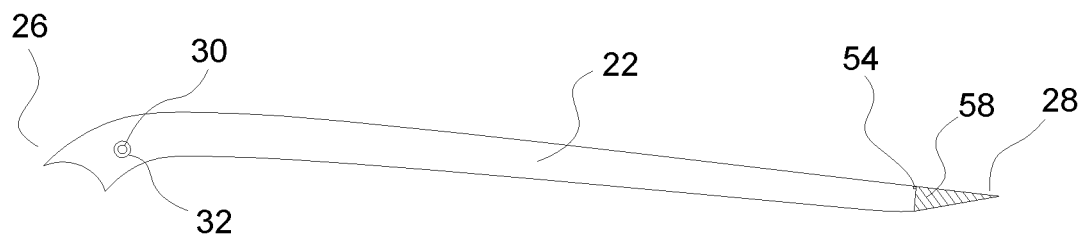
FIG. 16 is a side elevation view of the strut from FIG. 4, with a fairing end cap.

FIG. 16—Is a side elevation view of a strut 22 with a leading edge 26 end and a trailing edge 28 end showing the strut valve opening 32 with strut valve 30 protruding and a strut fairing end cap 58 that is affixed to the trailing edge 28 end of the strut next to the strut line opening 54.

Figure 17:
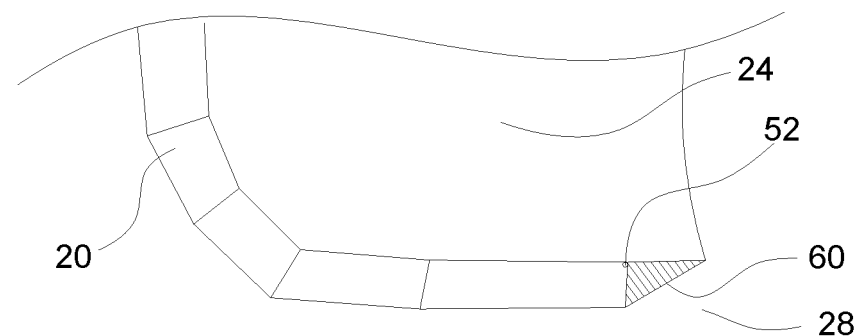
FIG. 17 is a side elevation view of the leading edge tube from FIG. 7, with a fairing end cap.

FIG. 17—Is a side elevation view of a leading edge tube 20 and canopy at the wingtip trailing edge 28 with a leading edge tube fairing end cap that is affixed to the trailing edge 28 end of the leading edge tube 20 next to the leading edge tube line opening.

Figure 18:
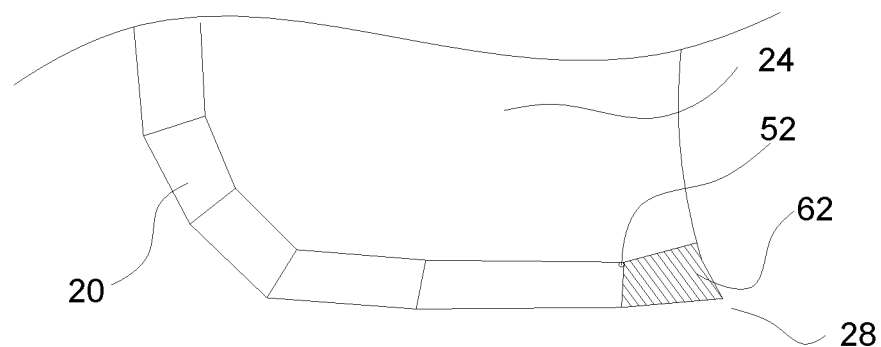
FIG. 18 is a side elevation view of the leading edge tube from FIG. 7, with an alternative embodiment of fairing end cap.

FIG. 18—Is a side elevation view of a leading edge tube 20 and canopy at the wingtip trailing edge 28 with a leading edge tube fairing end cap that is affixed to the trailing edge 28 end of the leading edge tube 20 next to the leading edge tube line opening.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A method of loading a bladder into an outer envelope of an inflatable kite, comprising:
    inserting the bladder through a valve opening in a portion of the outer envelope of the inflatable kite until a valve of the bladder is positioned in the valve opening,
wherein:
    the portion of the outer envelope is a leading edge tube;
    the bladder is a leading edge bladder; and
    the valve opening is for an inflation valve.

2. The method of claim 1, wherein the inserting of the bladder is accomplished by securing a line to a remote end of the bladder and using the line to draw the bladder through the valve opening.

3. The method of claim 2, wherein the portion of the outer envelope is a leading edge tube, the leading edge tube tapering to a point at a trailing edge, with a line opening, through which the line exits the leading edge tube, positioned at the trailing edge.

4. The method of claim 3, wherein the trailing edge of the leading edge tube is covered by a fairing end cap.

5. The method of claim 2, wherein the portion of the outer envelope is a strut, the strut tapering to a point at a trailing edge, with a line opening, through which the line exits the strut, positioned at the trailing edge.

6. The method of claim 5, wherein the trailing edge of the strut is covered by a fairing end cap.

7. The method of claim 2, wherein the line undergoes a change of direction.

8. The method of claim 7, wherein the line is looped over a line ring to facilitate the change in direction.

9. A method of loading a bladder into an outer envelope of an inflatable kite, comprising:
    inserting the bladder through a valve opening in a portion of the outer envelope of the inflatable kite until a valve of the bladder is positioned in the valve opening,
wherein:
    the portion of the outer envelope is a strut;
    the bladder is a strut bladder; and
    the valve opening is for a strut valve.

10. The method of claim 9, wherein the inserting of the bladder is accomplished by securing a line to a remote end of the bladder and using the line to draw the bladder through the valve opening.

11. The method of claim 10, wherein the strut tapers to a point at a trailing edge, with a line opening, through which the line exits the strut, positioned at the trailing edge.

12. The method of claim 11, wherein the trailing edge of the strut is covered by a fairing end cap.

13. The method of claim 10, wherein the line undergoes a change of direction.

14. The method of claim 13, wherein the line is looped over a line ring to facilitate the change in direction.

\* \* \* \* \*